(12) United States Patent
Yang et al.

(10) Patent No.: US 8,908,680 B2
(45) Date of Patent: Dec. 9, 2014

(54) APPARATUS FOR HYBRID-TRANSMITTING AND BRIDGING OF A CIRCUIT SERVICE AND A PACKET SERVICE

(75) Inventors: Zufa Yang, Wuhan (CN); Hongjun Gao, Shenzhen (CN); Zhiyong Huang, Shenzhen (CN); Xin Xiao, Shenzhen (CN); Bo Yin, Hubei (CN); Xiaojun Shen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 106 days.

(21) Appl. No.: 13/463,881

(22) Filed: May 4, 2012

(65) Prior Publication Data

US 2012/0269189 A1    Oct. 25, 2012

Related U.S. Application Data

(63) Continuation of application No. PCT/CN2011/073009, filed on Apr. 19, 2011.

(51) Int. Cl.
- *H04L 12/66* (2006.01)
- *H04J 3/16* (2006.01)
- *H04L 12/64* (2006.01)
- *H04J 3/06* (2006.01)

(52) U.S. Cl.
CPC ........ *H04L 12/6418* (2013.01); *H04J 3/0685* (2013.01); *H04J 3/1652* (2013.01); *H04J 2203/0085* (2013.01)
USPC ..................................................... 370/353

(58) Field of Classification Search
CPC . H04L 12/64; H04L 12/6402; H04L 12/6418; H04L 29/02; H04L 29/06068; H04L 65/102; H04J 3/1652; H04J 3/0685; H04J 2203/0085

USPC ......... 370/337, 347, 321, 352, 353, 355, 356, 370/360, 465, 466, 467
See application file for complete search history.

(56) References Cited

U.S. PATENT DOCUMENTS 6,519,261 B1    2/2003    Brueckheimer et al.
(Continued)

FOREIGN PATENT DOCUMENTS

| CN | 101150879 A | 3/2008 |
|---|---|---|
| CN | 101860481 A | 10/2010 |
| CN | 101924960 A | 12/2010 |

OTHER PUBLICATIONS

Partial Translation of First Chinese Office Action dated Oct. 10, 2012, in connection with Chinese Patent Application 201180000426.1, 7 pages.

(Continued)

*Primary Examiner* — Gary Mui
*Assistant Examiner* — Kabir Jahangir

(57) ABSTRACT

An apparatus and a system for hybrid-transmitting and bridging of a circuit service and a packet service are provided. The apparatus includes a TDM framing unit, a TDM three-direction cross unit, and a mapping and encapsulating unit. The TDM framing unit implements conversion between a line layer TDM signal outside the apparatus and channel layer TDM signals inside the apparatus, and transmits the channel layer TDM signals to the TDM three-direction cross unit. The TDM three-direction cross unit implements cross scheduling on the channel layer TDM signals from a TDM cross apparatus, the mapping and encapsulating unit, and the TDM framing unit. The mapping and encapsulating unit implements conversion between a channel layer TDM signal from the TDM three-direction cross unit and packet service signals from the packet processing unit.

6 Claims, 4 Drawing Sheets

(56) References Cited

U.S. PATENT DOCUMENTS

| | | |
|---|---|---|
| 2002/0075854 A1 | 6/2002 | Kumar et al. |
| 2002/0075869 A1* | 6/2002 | Shah et al. .................... 370/389 |
| 2005/0013313 A1* | 1/2005 | Liao et al. .................... 370/412 |
| 2007/0258444 A1* | 11/2007 | He ................................ 370/389 |
| 2007/0297411 A1* | 12/2007 | Zhong .......................... 370/392 |
| 2010/0157994 A1* | 6/2010 | Beisel et al. ................. 370/355 |
| 2011/0142036 A1* | 6/2011 | Kim et al. .................... 370/352 |

OTHER PUBLICATIONS

International Search Report from the International Searching Authority regarding Application No. PCT/CN2011/073009; dated (mailed) Feb. 2, 2012; Huawei Tech Co., Ltd. (4 pgs.).

European Patent Office Communication related to Application No. 11746884.3-1249; pursuant to Rule 62 EPC, the supplementary European search report and the European search opinion; dated (mailed) May 21, 2012; Huawei Technologies Co., Ltd. (5 pgs.).

* cited by examiner

US 8,908,680 B2

APPARATUS FOR HYBRID-TRANSMITTING AND BRIDGING OF A CIRCUIT SERVICE AND A PACKET SERVICE

CROSS-REFERENCE TO RELATED APPLICATION

This application is a continuation of International Application No. PCT/CN2011/073009, filed on Apr. 19, 2011, which is hereby incorporated by reference in its entirety.

FIELD OF THE INVENTION

The present invention relates to the field of communications technologies, and in particular, to an apparatus for hybrid-transmitting and bridging of a circuit service and a packet service.

BACKGROUND OF THE INVENTION

With the development of IP-based mobile services and video-based fixed services, the demand for network bandwidth becomes greater and greater and carrier class bearer requirements are required to be provided for the service quality. A conventional TDM (Time Division Multiplexing, time division multiplexing) switching device, such as the SDH (Synchronous Digital Hierarchy, synchronous digital hierarchy) and the MSTP (Multi-Service Transfer Platform, SDH-based multi-service transfer platform) for providing telecommunication services, cannot meet telecommunication carriers' demand for large bandwidth.

At present, industry participants have mainly put forward two kinds of transmission devices oriented to future carrier class IP services. One mainstream kind of device is an OTN (Optical Transport Network, optical transport network) device. Similar to an SDH device, an OTN device is also based on the TDM technology, but is oriented to IP/Ethernet services. Larger than the timeslot of 2 Mbits/s of SDH (applicable to E1 signals), the minimum bandwidth for each timeslot of the OTN device is 1.25 Gbits/s (applicable to GE signals). The other mainstream kind of device is a PTN (Packet Transport Network, packet transport network) device. The PTN device based on the packet switching technology is applicable to packet services of various kinds of bandwidth.

FIG. 1a is a schematic diagram of a PTN device and an OTN device that transmit services independently according to the prior art. As shown in FIG. 1a, path 1a is an OTN service transmission path, path 2a is a PTN service transmission path, and path 3a is a path for the interworking between an OTN device and a PTN device. Conventionally, a PTN device and an OTN device transmit services independently, occupy different device spaces and occupy different optical fibers. If service interworking is required between a PTN device and an OTN device, maintenance personnel need to manually perform optical fiber jumping connection. Therefore, the adjustment is very inconvenient.

SUMMARY OF THE INVENTION

Embodiments of the present invention provide an apparatus for hybrid-transmitting and bridging of a circuit service and a packet service, so as to implement service interworking between an OTN device and a PTN device.

In one aspect, an embodiment of the present invention provides an apparatus for hybrid-transmitting and bridging of a circuit service and a packet service. The apparatus includes a TDM framing unit, a TDM three-direction cross unit, and a mapping and encapsulating unit. The TDM framing unit is connected to the TDM three-direction cross unit, is configured to implement conversion between a line layer TDM signal outside the apparatus for hybrid-transmitting and bridging and channel layer TDM signals inside the apparatus for hybrid-transmitting and bridging, and is configured to transmit the channel layer TDM signals to the TDM three-direction cross unit. The TDM three-direction cross unit is connected to the TDM framing unit, the mapping and encapsulating unit, and a TDM cross apparatus outside the apparatus for hybrid-transmitting and bridging, and is configured to perform cross scheduling on TDM signals from the TDM cross apparatus, the mapping and encapsulating unit, and the TDM framing unit. The mapping and encapsulating unit is connected to the TDM three-direction cross unit and the packet processing unit, is configured to convert a TDM signal from the TDM three-direction cross unit into packet service signals and provide the packet service signals to the packet processing unit, and is configured to convert packet service signals from the packet processing unit into a TDM signal and provide the TDM signal to the TDM three-direction cross unit.

The apparatus for hybrid-transmitting and bridging of a circuit service and a packet service of the embodiment of the present invention combines electrical-layer signals of an OTN plane and electrical-layer signals of a packet plane together, and implements the scheduling of PTN signals and OTN signals through the TDM three-direction cross unit, so as to implement service interworking between an OTN device and a PTN device and avoid the inconvenience caused by the jumping connection of landing optical fibers between a PTN plane and an OTN plane.

DETAILED DESCRIPTION OF THE EMBODIMENTS

In order to make the objectives, technical solutions, and advantages of the present invention more comprehensible, the technical solutions according to embodiments of the present invention are clearly and completely described in the following with reference to the accompanying drawings. Apparently, the embodiments in the following description are merely a part rather than all of the embodiments of the present invention. All other embodiments obtained by persons of ordinary skill in the art based on the embodiments of the present invention without creative effects shall fall within the protection scope of the present invention.

At present, industry participants have put forward a concept about a device which integrates the OTN and the PTN. Such device is generally called POTS (Packet Optical Transport System, packet optical transport system)/P-OTN (Packet Optical Transport Network, packet optical transport network), the common feature of POTS and P-OTN is that whole functions that an independent OTN device and an independent PTN device can provide are integrated in a single entity, thereby saving the space of a device. Most of the key modules of such a device can use existing PTN device and OTN device technologies. Generally, the device is just a simple combination of PTN/OTN devices and still incapable of implementing the interworking between a PTN device and an OTN device.

Figure 1A:
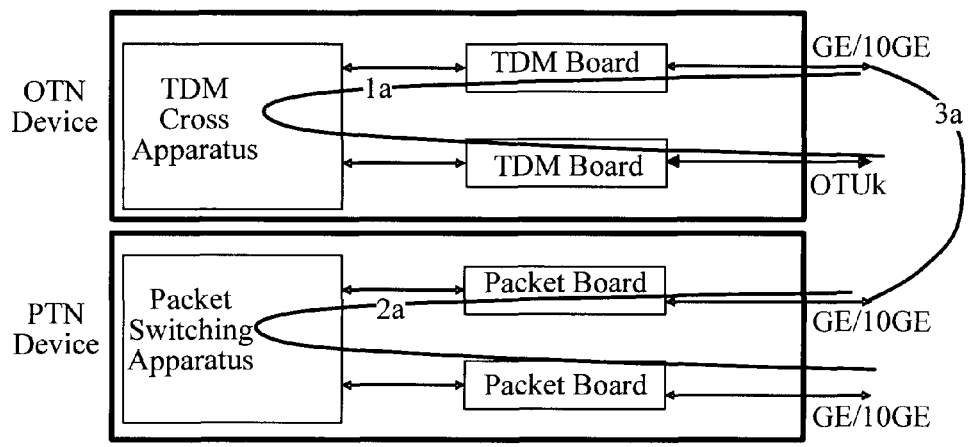
FIG. 1a is a schematic diagram of a PTN device and an OTN device that transmit services independently according to the prior art.
Figure 1B:
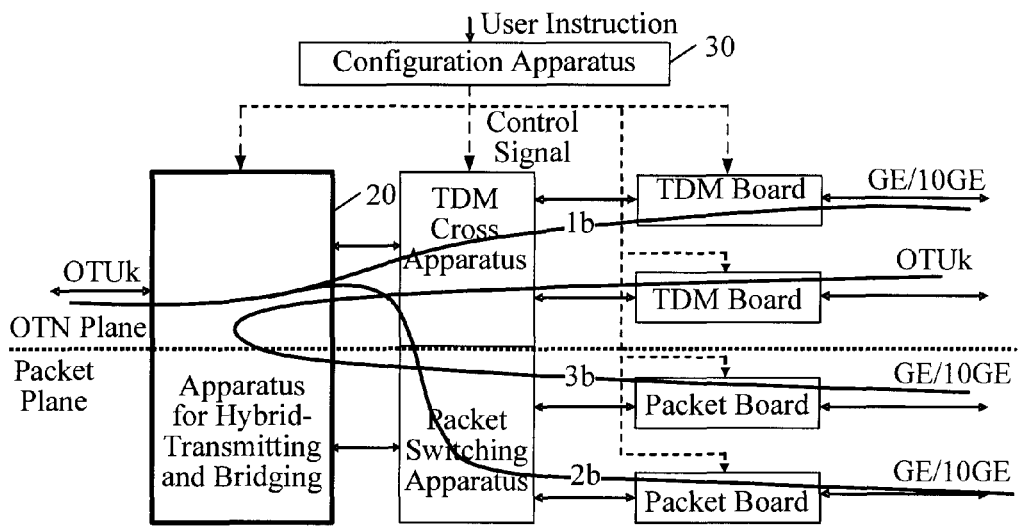
FIG. 1b is a schematic diagram containing principles of a system for hybrid-transmitting and bridging according an embodiment of the present invention.

An embodiment of the present invention provides a system for hybrid-transmitting and bridging of a circuit service and a packet service. In an existing P-OTN/POTS entity, the system integrates an apparatus for hybrid-transmitting and bridging of a circuit service and a packet service provided by an embodiment of the present invention. FIG. 1b is a schematic diagram of an apparatus 20 for hybrid-transmitting and bridging showing principles of P-OTN/POTS according to an embodiment of the present invention.

As shown in FIG. 1b, the apparatus 20 for hybrid-transmitting and bridging according to an embodiment of the present invention is connected to a TDM cross apparatus of an OTN plane and a packet switching apparatus of a packet plane in a P-OTN/POTS device. The system is capable of implementing three service paths, which are an OTN service transmission path 1b, a PTN service transmission path 2b, and an OTN/PTN interworking path 3b.

The principle of each function module in FIG. 1b is described as follows:

(1) A TDM board: provides a function of encapsulating a GE/10GE signal into an OTN signal in OTUk form;

(2) A TDM cross apparatus: provides an OTN cross function with which a certain OTN timeslot of any TDM board may be crossed to a certain OTN timeslot of another TDM board, so as to implement a service scheduling function;

(3) A packet board: provides a function of encapsulating a GE/10GE signal into a packet channel for transmission;

(4) A packet switching apparatus: provides a packet switching function with which any packet board message may be forwarded to another packet board.

(5) The apparatus 20 for hybrid-transmitting and bridging according to an embodiment of the present invention provides the following functions:

A. Hybrid-transmitting function for services of OTN/packet planes: electrical layer signals of an OTN plane and a packet plane are combined together, and proportions of bandwidth occupied by the OTN/PTN transmission may be flexibly allocated. In this manner, an optical fiber or a wavelength is shared by OTN and PTN transmission channels for the hybrid-transmitting, thereby improving bandwidth utilization.

B. Bridging function of OTN/packet planes: A user can establish a service interworking path between any packet board and any TDM board through flexible configuration, so as to avoid the inconvenience caused by jumping connection of landing optical fibers between a PTN plane and an OTN plane.

Through the combination of the preceding modules, the system as shown in FIG. 1b may support the following three types of service transmission paths:

An OTN service transmission path: services such as GE/10GE are encapsulated in an OTN channel, and then scheduling and transmission are implemented.

A PTN service transmission path: services such as GE/10GE are encapsulated in a packet channel, and then scheduling and transmission are implemented.

An OTN/PTN interworking path: services such as GE/10GE that are transmitted by an OTN plane are forwarded to a packet plane through the bridging.

(6) Optionally, the system of the embodiment of the present invention also provides a configuration apparatus 30 (as shown in FIG. 1b) which is configured to receive a user instruction and select a specific packet board and a specific TDM board, to enable the selected packet board and TDM board to implement service interworking through the apparatus for hybrid-transmitting and bridging. In addition, the configuration apparatus 30 also supports a configuration management function and an interface that are commonly used by PTN/OTN devices.

Figure 2:
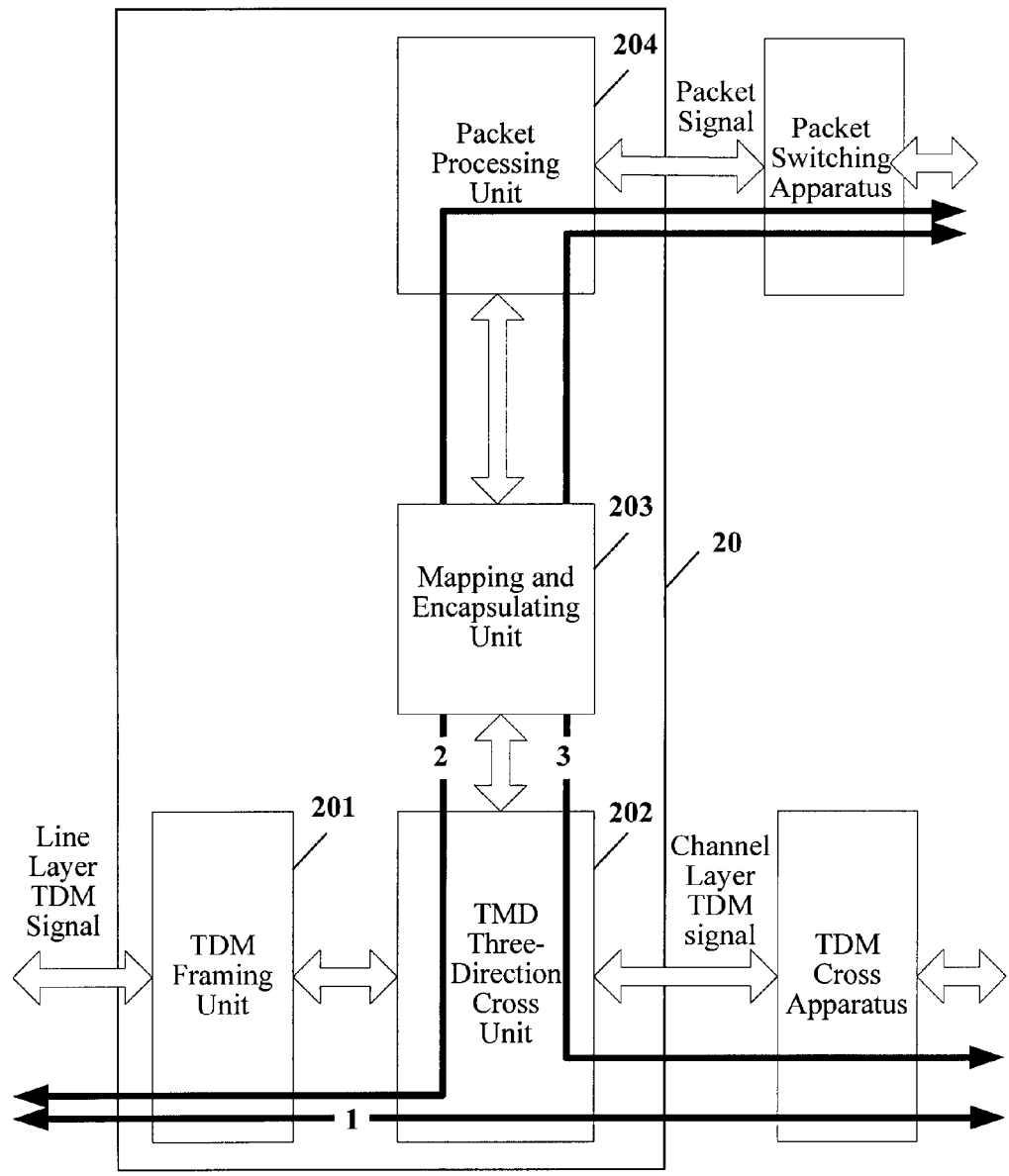
FIG. 2 is a function structure diagram of an apparatus 20 for hybrid-transmitting and bridging of a circuit service and a packet service according to an embodiment of the present invention.

FIG. 2 is a function structure diagram of an apparatus 20 for hybrid-transmitting and bridging of a circuit service and a packet service according to the present invention. In FIG. 2, TDM may represent OTN or SDH. The apparatus 20 is connected to an external packet switching apparatus and an external TDM cross apparatus. The apparatus 20 for hybrid-transmitting and bridging according to the embodiment includes a TDM framing unit 201, a TDM three-direction cross unit 202, a mapping and encapsulating unit 203, and a packet processing unit 204. The apparatus 20 can be implemented through one or more boards.

(1) The TDM framing unit 201 is connected to the TDM three-direction cross unit 202, is configured to implement the conversion between a line layer TDM signal outside the apparatus 20 for hybrid-transmitting and bridging and channel layer TDM signals inside the apparatus 20 for hybrid-transmitting and bridging, and is configured to transmit the channel layer TDM signals generated through the conversion to the TDM three-direction cross unit 202.

Figure 3:
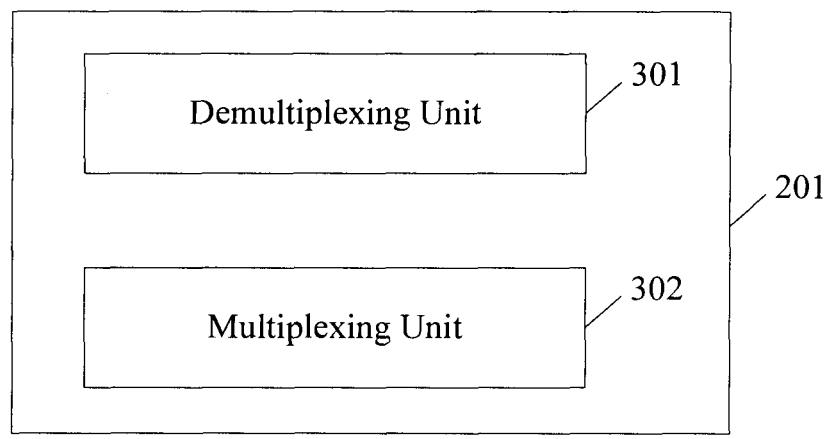
FIG. 3 is a detailed function block diagram of a TDM framing unit 201 of the apparatus 20 for hybrid-transmitting and bridging according an embodiment of the present invention.

FIG. 3 is a detailed function block diagram of the TDM framing unit 201. As shown in FIG. 3, the TDM framing unit 201 includes: a demultiplexing unit 301 configured to demultiplex the line layer TDM signal and generate the channel layer TDM signals, and a multiplexing unit 302 configured to multiplex the channel layer TDM signals and generate the line layer TDM signal.

The line layer TDM signal is a high-speed TDM signal, while the channel layer TDM signal is a low-speed TDM signal. A high-speed line layer TDM signal can be obtained by multiplexing a plurality of low-speed channel layer TDM signals, and a plurality of low-speed channel layer TDM signals can be obtained by demultiplexing a line layer TDM signal.

(2) The TDM three-direction cross unit 202 is connected to the TDM framing unit 201, the mapping and encapsulating unit 203, and the TDM cross apparatus outside the apparatus 20 for hybrid-transmitting and bridging, and is configured to perform cross scheduling for channel layer TDM signals from the TDM cross apparatus, the mapping and encapsulating unit 203, and the TDM framing unit 201.

Through the cross scheduling performed by the TDM three-direction cross unit 202 and the TDM cross apparatus, when electrical layer signals of the OTN plane and the packet plane are combined together, proportions of bandwidth occupied by the OTN and PTN transmission may be flexibly allocated. For example, when the TDM three-direction cross unit 202 provides channel layer TDM signals to the TDM framing unit 201 for performing a multiplexing operation on the channel layer TDM signals, the proportions of the channel layer TDM signals from the mapping and encapsulating unit 203 and the TDM cross apparatus are determined, so as to adjust the proportions of the bandwidth occupied by the OTN transmission and the PTN transmission.

Figure 4:
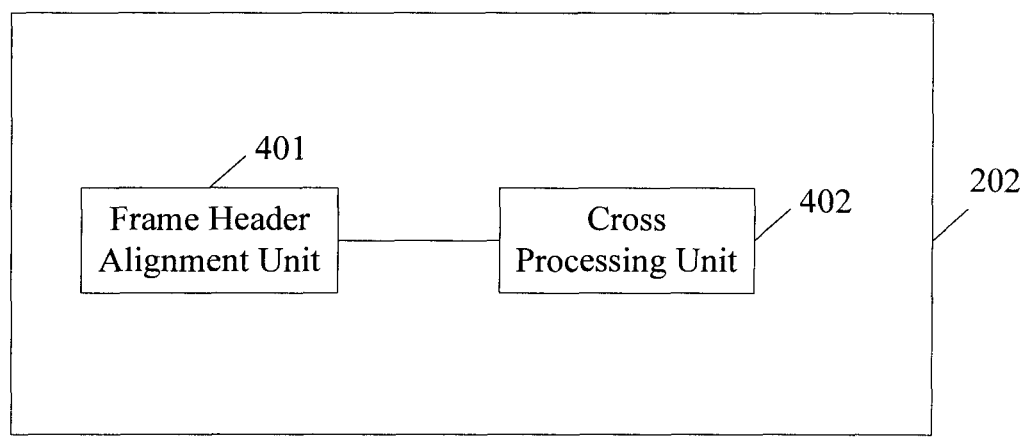
FIG. 4 is a detailed function block diagram of a TDM three-direction cross unit 202 of the apparatus 20 for hybrid-transmitting and bridging according an embodiment of the present invention.

FIG. 4 is a detailed function block diagram of the TDM three-direction cross unit 202. As shown in FIG. 4, the TDM three-direction cross unit 202 includes a frame header alignment unit 401 and a cross processing unit 402. The frame header alignment unit 401 is configured to switch clocks of channel layer TDM signals from the TDM cross apparatus, the TDM framing unit 201, and the mapping and encapsulating unit 203 to a clock of the TDM three-direction cross unit 202, so as to implement frame header alignment of the channel layer TDM signals. The cross processing unit 402 is configured to implement cross scheduling of the channel layer TDM signals between the TDM framing unit 201 and the TDM cross apparatus, cross scheduling of the channel layer TDM signals between the TDM framing unit 201 and the mapping and encapsulating unit 203, and cross scheduling of the channel layer TDM signals between the TDM cross apparatus and the mapping and encapsulating unit 203.

Figure 5:
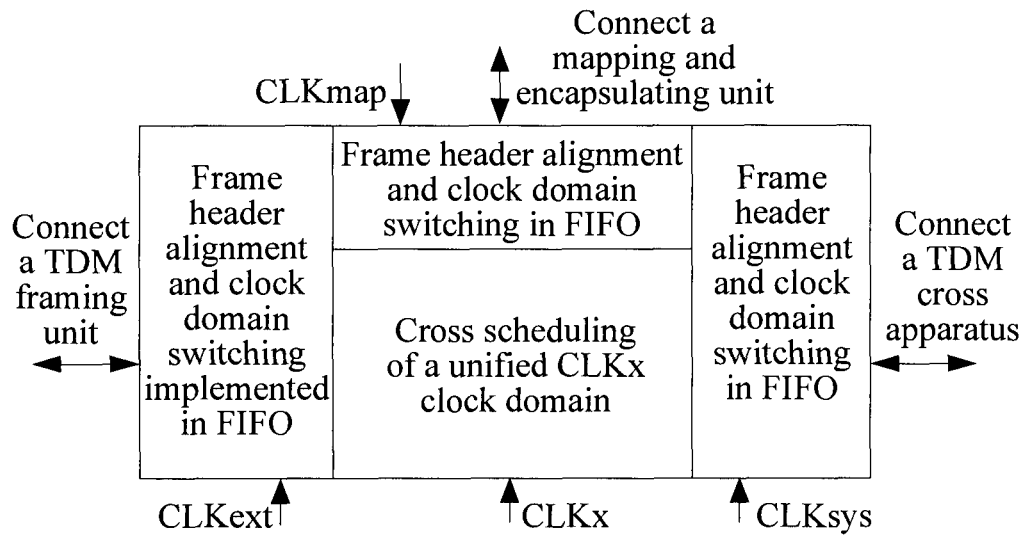
FIG. 5 is a schematic diagram of the implementation principle of a frame header alignment unit 401 of the apparatus 20 for hybrid-transmitting and bridging according an embodiment of the present invention.

FIG. 5 shows the implementation mechanism of the frame header alignment unit 401. Because the channel layer TDM signals from the TDM cross apparatus, the TDM framing unit 201, and the mapping and encapsulating unit 203 may be in different clock domains, that is, signal sources of the TDM cross apparatus, the TDM framing unit 201, and the mapping and encapsulating unit 203 use different clocks CLKsys/CLKext/CLKmap to transmit signals, and therefore, the channel layer TDM signals have different clock frequencies and phases. The frame header alignment unit 401 switches a clock domain to track a unified clock CLKx provided by the frame header alignment unit 401 to align frame headers of the channel layer TDM signals, and then unified cross scheduling for the channel layer TDM signals may be implemented.

(3) The mapping and encapsulating unit 203 is connected to the TDM three-direction cross unit 202 and the packet processing unit 204, is configured to convert a channel layer TDM signal from the TDM three-direction cross unit 202 into packet service signals and provide the packet service signals to the packet processing unit 204, and is configured to convert packet service signals from the packet processing unit 204 into a channel layer TDM signal and provide the channel layer TDM signal to the TDM three-direction cross unit 202.

Figure 6:
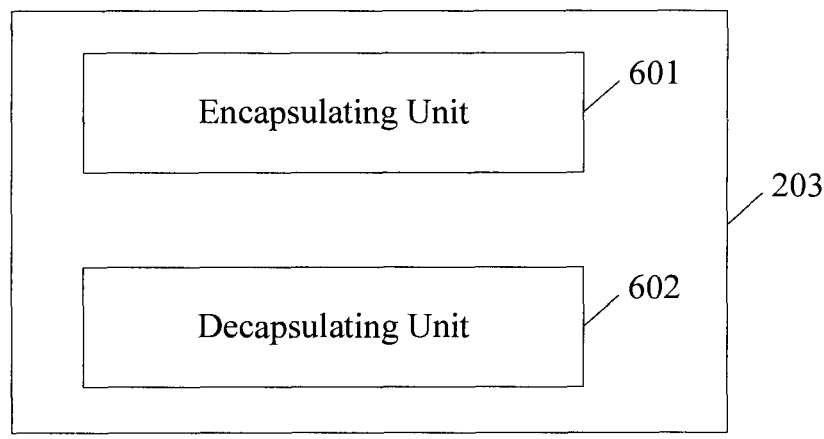
FIG. 6 is a detailed function block diagram of a mapping and encapsulating unit 203 of the apparatus 20 for hybrid-transmitting and bridging according an embodiment of the present invention.

FIG. 6 is detailed function block diagram of the mapping and encapsulating unit 203. As shown in FIG. 6, the mapping and encapsulating unit 203 includes an encapsulating unit 601 and a decapsulating unit 602. The encapsulating unit 601 is configured to encapsulate packet service signals from the packet processing unit 204 in a TDM timeslot channel to generate a channel layer TDM signal, and transmit the channel layer TDM signal to the TDM three-direction cross unit 202. The decapsulating unit 602 is configured to receive a channel layer TDM signal from the TDM three-direction cross unit 202, and obtain packet service signals by decapsulating the channel layer TDM signal and transmit the packet service signals to the packet processing unit 204.

Optionally, the TDM timeslot channel's bandwidth used by the encapsulating unit 601 is a fixed bandwidth or variable bandwidth. Flexible allocation of proportions of bandwidth occupied by the OTN and PTN transmission is implemented jointly through flexible configuration of the TDM timeslot channel and the flexible scheduling of the preceding TDM three-direction cross unit 202.

(4) The packet processing unit 204 is connected to the mapping and encapsulating unit 203 and the packet switching apparatus outside the apparatus 20 for hybrid-transmitting and bridging, and is configured to forward the packet service signals from the mapping and encapsulating unit 203 and the packet switching apparatus. In addition, the packet processing unit 204 is configured to perform classification, filtering, and queue scheduling on a packet.

In the schematic structural diagram of the apparatus 20 as shown in FIG. 2, three types of supported service paths are described as follows. An embodiment of the present invention can be configured with one or any combination of the three types of service paths.

(1) A service path 1: The service path 1 is a hybrid-transmitting service path for the OTN plane and the objective is to mix channel layer TDM signals from the TDM cross apparatus and channel layer TDM signals from another path into an external line layer TDM signal for transmission.

The detailed processing flow is: An external line layer TDM signal is received, the external line layer TDM signal is processed by the TDM framing unit 201 to generate channel layer TDM signals, the channel layer TDM signals are transmitted to the TDM three-direction cross unit 202 for cross scheduling, and then the TDM signals are transmitted to the external TDM cross apparatus. In the reverse direction, channel layer TDM signals are fed from the TDM cross apparatus, the channel layer TDM signals are cross scheduled by the TDM three-direction cross unit 202, the channel layer TDM signals are transmitted to the TDM framing unit 201 for multiplexing to a line layer TDM signal, and then the line layer TDM signal is transmitted.

(2) A service path 2: The service path 2 is a hybrid-transmitting path for the packet plane and the objective is to encapsulate packet service signals into a channel layer TDM signal, and mix the channel layer TDM signal with a channel layer TDM signal from another path into an external line layer TDM signal for transmission.

The detailed processing flow is: An external line layer TDM signal is received, the external line layer TDM signal is then processed by the TDM framing unit 201 to generate channel layer TDM signals, the channel layer TDM signals are transmitted to the TDM three-direction cross unit 202 for cross scheduling, the channel layer TDM signals are transmitted to the mapping and encapsulating unit 203, the channel layer TDM signals are decapsulated to obtain packet service signals, the packet service signals are transmitted to the packet processing unit 204 for packet message processing, and finally the packet service signals are transmitted to the external packet switching apparatus. In the reverse direction, packet service signals are fed from the packet switching apparatus, the packet processing unit 204 performs packet message processing on the packet service signals, the packet service signals are transmitted to the mapping and encapsulating unit 203, the packet service signals are encapsulated to obtain a channel layer TDM signal, the channel layer TDM signal is transmitted to the TDM three-direction cross unit 202 for cross scheduling, the channel layer TDM signal is multiplexed by the TDM framing unit 201 to generate a line layer TDM signal, and then the line layer TDM signal is transmitted.

(3) A service path 3: The service path 3 is an interworking service path of the OTN and PTN planes, and the objective is to implement the interworking of the packet service signals of the PTN plane and the channel layer TDM signal of the OTN plane.

The detailed processing flow is: A channel layer TDM signal is fed from the external TDM cross apparatus, the channel layer TDM signal is transmitted to the TDM three-direction cross unit 202 for cross scheduling, the channel layer TDM signal is transmitted to the mapping and encapsulating unit 203, the channel layer TDM signal is decapsulated into packet service signals, the packet service signals are transmitted to the packet processing unit 204, after the packet processing unit 204 performs packet processing on the packet service signals, and then the packet service signals are transmitted to the external packet switching apparatus. In the reverse direction, packet service signals are fed from the packet switching apparatus, and after the packet processing unit 204 performs packet message processing on the packet service signals, the packet service signals are transmitted to the mapping and encapsulating unit 203, the packet service services are encapsulated into a channel layer TDM signal, the channel layer TDM signal is transmitted to the TDM three-direction cross unit 202 for cross scheduling, and then the channel layer TDM signal is transmitted to the TDM cross apparatus.

An embodiment of the present invention also provides a method for hybrid-transmitting and bridging of a circuit service and a packet service. The method implements the processing flows of one or more paths among an OTN service transmission path, a PTN service transmission path, and an OTN and PTN interworking path.

The processing flow of the OTN service transmission path includes: receiving a line layer TDM signal, converting the line layer TDM signal into channel layer TDM signals, and providing the channel layer TDM signals to the TDM cross apparatus; and receiving channel layer TDM signals transmitted by the TDM cross apparatus, converting the channel layer TDM signals into a line layer TDM signal and transmitting the line layer TDM signal to an external line layer.

The processing flow of the PTN service transmission path includes: receiving a line layer TDM signal, converting the line layer TDM signal into packet service signals, and providing the packet service signals to the packet switching apparatus; and receiving packet service signals transmitted by the packet switching apparatus, converting the packet service signals into a line layer TDM signal, and transmitting the line layer TDM signal to the external line layer.

The processing flow of the OTN and PTN interworking path includes: receiving packet service signals from the packet switching apparatus, converting the packet service signals into a channel layer TDM signal, and proving the channel layer TDM signal to the TDM cross apparatus; and receiving a channel layer TDM signal from the TDM cross apparatus, converting the channel layer TDM signal into packet service signals, and proving the packet service signals to the packet switching apparatus.

Optionally, in the processing flow of the OTN service transmission path, the converting the line layer TDM signal into the channel layer TDM signals and providing the channel layer TDM signals to the TDM cross apparatus includes: demultiplexing the line layer TDM signal, generating the channel layer TDM signals and providing the channel layer TDM signals to the TDM cross apparatus; the converting the channel layer TDM signals into the line layer TDM signal and transmitting the line layer TDM signal to the external line layer includes: multiplexing the channel layer TDM signals, generating the line layer TDM signal and transmitting the line layer TDM signal to the external line layer.

Optionally, in the processing flow of the OTN and PTN interworking path, the converting the packet service signals into the channel layer TDM signal and providing the channel layer TDM signal to the TDM cross apparatus includes: encapsulating the packet service signals in a TDM timeslot channel to generate the line layer TDM signal, and providing the line layer TDM signal to the TDM cross apparatus; the converting the channel layer TDM signal into the packet service signals and providing the packet service signals to the packet switching apparatus includes: obtaining the packet service signals by decapsulating the channel layer TDM signal, and transmitting the packet service signals to the packet processing unit 204.

The technical solutions according to embodiments of the present invention support the function of hybrid-transmitting and bridging of a circuit service and a packet service on a POTS/P-OTN device system with TDM cross and packet switching. The technical solutions bring the following benefits:

(1) Hybrid-transmitting function: As shown in FIG. 2, a path of line layer TDM signals may include both a signal of an OTN service transmission path and a signal of a PTN service transmission path, and it can be implemented that an optical fiber or a wavelength is shared by transmission channels of the OTN plane and the PTN plane for the hybrid-transmitting, thereby improving bandwidth utilization. In addition, by combining a signal of the OTN plane and a signal of the packet plane together, proportions of bandwidth occupied by the OTN/PTN transmission may be flexibly allocated.

(2) Bridging function: A user can flexibly configure a service interworking path between any packet board and any TDM board, so as to avoid the inconvenience caused by jumping connection of landing optical fibers of the PTN and OTN separation devices.

Persons of ordinary skill in the art should understand that all or a part of the steps of the methods according to the embodiments of the present invention may be implemented by a program instructing relevant hardware. The program may be stored in a computer readable storage medium. When the program is executed, the steps of the methods according to the embodiments are performed. The storage medium may be any medium that is capable of storing program codes, such as a ROM, a RAM, a magnetic disk, and an optical disk.

The above embodiments are merely provided for describing the technical solutions of the embodiments of the present invention, but not intended to limit the present invention. It should be understood by persons of ordinary skill in the art that although the embodiments of the present invention are described in detail with reference to the foregoing embodiments, modifications can be made to the technical solutions described in the embodiments, or equivalent replacements can be made to some technical features in the technical solutions, as long as such modifications or replacements do not make the essence of the corresponding technical solutions depart from the spirit and the scope of the technical solutions of the embodiments of the present invention.

What is claimed is:

1. An apparatus for hybrid-transmitting and bridging of a circuit service and a packet service, the apparatus comprising a TDM framing unit, a TDM three-direction cross unit, and a mapping and encapsulating unit;

wherein:

the TDM framing unit is connected to the TDM three-direction cross unit, is configured to implement conversion between line layer TDM signals outside the apparatus and channel layer TDM signals inside the apparatus, and is configured to transmit channel layer TDM signals to the TDM three-direction cross unit;

the TDM three-direction cross unit is connected to the TDM framing unit, the mapping and encapsulating unit, and a TDM cross apparatus outside the apparatus, and is configured to implement cross scheduling of channel layer TDM signals between the TDM framing unit and the TDM cross apparatus, cross scheduling of channel layer TDM signals between the TDM framing unit and the mapping and encapsulating unit, and cross scheduling of channel layer TDM signals between the TDM cross apparatus and the mapping and encapsulating unit; and the mapping and encapsulating unit is connected to the TDM three-direction cross unit and a packet processing unit, is configured to implement conversion between channel layer TDM signals from the TDM three-direction cross unit and packet service signals from the packet processing unit.

2. The apparatus according to claim 1, wherein the TDM framing unit comprises:
a demultiplexing unit, configured to demultiplex line layer TDM signals and generate channel layer TDM signals; and
a multiplexing unit, configured to multiplex channel layer TDM signals and generate line layer TDM signals.

3. The apparatus according to claim 1, wherein the TDM three-direction cross unit comprises:
a frame header alignment unit, configured to switch clocks of channel layer TDM signals from the TDM cross apparatus, the TDM framing unit, and the mapping and encapsulating unit to a clock of the TDM three-direction cross unit, to implement frame header alignment of channel layer TDM signals.

4. The apparatus according to claim 1, wherein the mapping and encapsulating unit comprises:
an encapsulating unit, configured to encapsulate packet service signals from the packet processing unit in one or more TDM timeslot channels to generate channel layer TDM signals, and transmit channel layer TDM signals to the TDM three-direction cross unit; and
a decapsulating unit, configured to receive channel layer TDM signals from the TDM three-direction cross unit, obtain packet service signals by decapsulating channel layer 1DM signals, and transmit packet service signals to the packet processing unit.

5. The apparatus according to claim 4, wherein one or more TDM timeslot channels bandwidth used by the encapsulating unit is a fixed bandwidth or variable bandwidth.

6. The apparatus according to claim 1, further comprising the packet processing unit; wherein the packet processing unit is connected to the mapping and encapsulating unit and a packet switching apparatus outside the apparatus, and is configured to forward packet service signals from the mapping and encapsulating unit and the packet switching apparatus.

\* \* \* \* \*